July 14, 1925.
R. E. SMITH
LICENSE PLATE HOLDER AND ILLUMINATING MEANS THEREFOR
Filed March 10, 1923   2 Sheets-Sheet 1
1,546,321
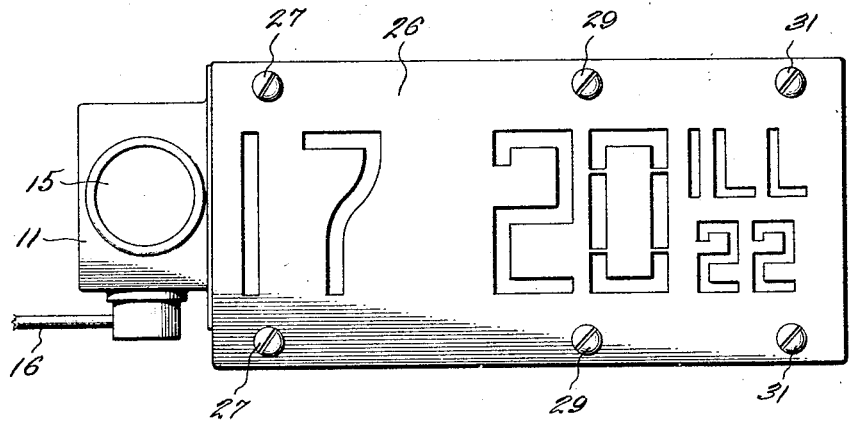
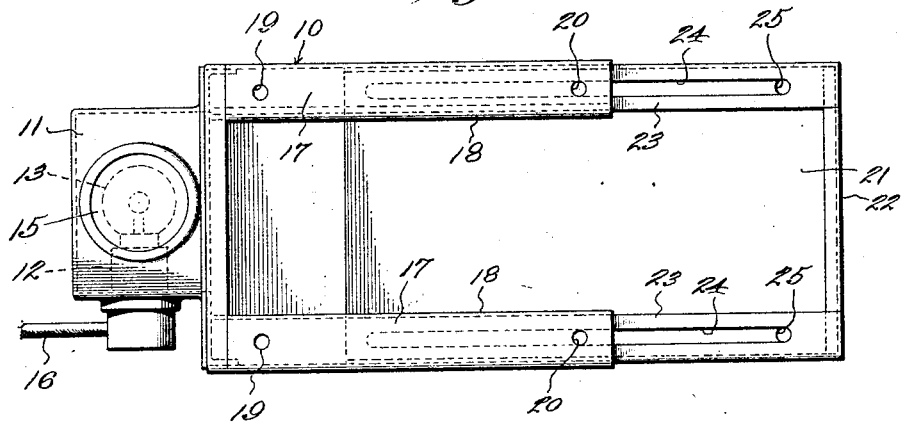
R. E. Smith,
INVENTOR
BY Victor J. Evans
ATTORNEY
WITNESSES July 14, 1925. 1,546,321
R. E. SMITH
LICENSE PLATE HOLDER AND ILLUMINATING MEANS THEREFOR
Filed March 10, 1923 2 Sheets-Sheet 2
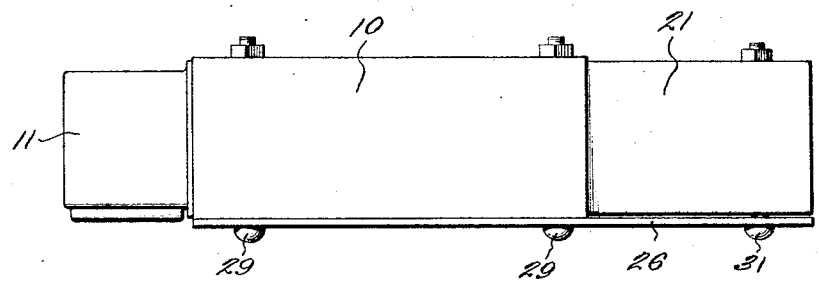
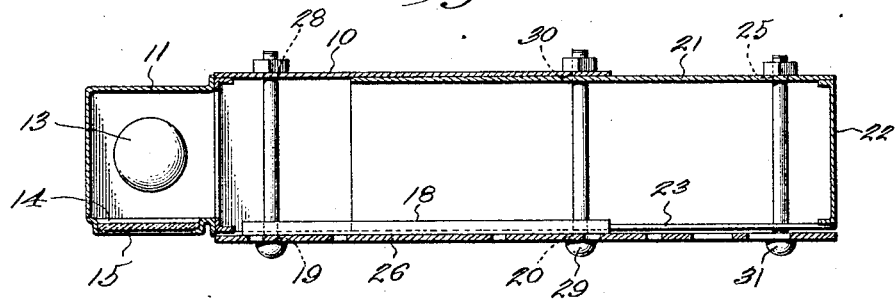
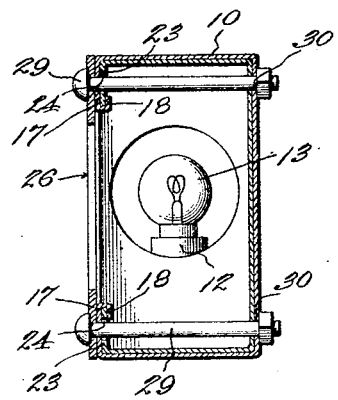

Patented July 14, 1925.

1,546,321

UNITED STATES PATENT OFFICE.

RICHARD E. SMITH, OF MASON CITY, ILLINOIS.

LICENSE-PLATE HOLDER AND ILLUMINATING MEANS THEREFOR.

Application filed March 10, 1923. Serial No. 624,239.

*To all whom it may concern:*

Be it known that I, RICHARD E. SMITH, a citizen of the United States, residing at Mason City, in the county of Mason and State of Illinois, have invented new and useful Improvements in License-Plate Holders and Illuminating Means Therefor, of which the following is a specification.

This invention relates to license plates for automobiles and has for its object the provision of a novel holder containing illuminating means and carrying the license plate which has the State name and license number cut out, so that the light within the holder will be visible and will render the number easily legible by night as well as by day.

An important object is the provision of a device of this character which serves the additional purpose of acting as a tail lamp.

Another object is the provision of a device of this character in which the holder is adjustable for taking care of plates of widely different lengths, the holder being furthermore of such construction that it may be quickly and easily taken apart and cleaned in case it should become excessively caked with mud or the like, the formation of the number from cut out figures having the additional advantage of preventing obliteration of the number by any accumulation of mud for the reason that any mud falling onto the device will pass through the openings into the holder from which it may be subsequently removed with the utmost ease.

An additional object is the provision of a device of this character which will be simple and inexpensive to manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is an elevation of the device,

Figure 2 is a similar view with the license plate removed,

Figure 3 is a top plan view,

Figure 4 is a longitudinal horizontal section,

Figure 5 is a vertical cross section.

Referring more particularly to the drawings I have shown my device as comprising a casing which includes a stationary section 10 formed of sheet metal or the like and provided at one end with a small housing 11 within which is located a socket 12 for an incandescent bulb 13 which projects its light through an opening 14 covered by ruby glass 15 so as to define a tail light. The wires 16 leading from the socket 12 are shown and of course may be connected with whatever control circuit is provided. The housing 11 communicates with the stationary section 10 of the casing so that the light from the bulb will illuminate the casing also.

The stationary section 10 of the casing has its other end open and its front is also open, the top and bottom walls being bent to define flanges 17 terminating in rolled beads 18 constituting guides. These flanges 17 are formed with holes 19 and 20 for a purpose to be described.

The casing also includes a movable section 21 which is of rectangular shape and which has its outer end closed by a wall 22 and its other end open. The front of this movable section is also open except that the top and bottom walls are formed with flanges 23 slidably engaging against the flanges 17 and engaging the beads 18. The flanges 23 are formed with longitudinal slots 24 which register with the holes 20 and the back wall of this movable section is also formed with holes 25.

The license plate is designated by the numeral 26 and has the State name, the year and the license number cut out so that the light within the casing will be visible. This license plate is held upon the casing by means of bolts 27 which pass through the holes 19 and through other holes 28 in the back of the stationary section 10. In order to hold the license plate at its center, I provide bolts 29 which pass through the holes 20, slots 24 and through holes 30 in the back wall of the stationary section. The extremity of the plate is held by bolts 31 which pass through the plate, through the slots 24 and through the holes 25. In this way it will be seen that owing to the fact that the movable section of the casing is slidable telescopically with respect to the stationary section the casing may be varied in length so as to agree exactly with the length of the license plate so that there will be no cumbersome, unwieldy and excessively large casing for holding the license plate, the adjustment being moreover very easily accomplished owing to the provision of the slots 24 through which pass certain of the securing bolts.

Any suitable bracket means, not shown, may be provided for mounting the device upon a vehicle and such bracket may have whatever form or shape is desired and may be constructed of any preferred materials such as may be found advisable in actual practice. It might also be well to mention that different colors for the different States may be properly indicated by using a colored bulb or a piece of colored glass which will have a place provided for it in the holder, if any State desires to use this means of showing the proper State indication at night.

In the use of the device it is apparent that when the incandescent bulb 13 is energized the device constitutes not only a tail light but also insures illumination of the license plate so that the number may be easily read by an officer or other interested party even at a considerable distance. If any mud should splash onto the plate it will pass through the cut out figures instead of interfering with the legibility and by removing the bolts 29 the slidable section of the casing may be removed to permit any accumulation of mud or the like to be removed.

From the foregoing description and a study of the drawings it will be apparent that I have thus provided a simple and inexpensive combined license plate holder, illuminator and tail light which will be of manifest advantage as being always legible and which is not likely to get out of order.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A device of the character described comprising a casing of rectangular shape including a stationary section having one end and its front open, and its other end partly closed, a housing carried by said partly closed end and containing an incandescent bulb mounted within a socket, the front of the housing being provided with an opening covered by red glass, said section being formed with longitudinally extending flanges at its front, the casing further including a movable section telescopically engaging within the stationary section and having one end and its front open and its other end closed, the movable section being provided with longitudinal flanges formed with slots, a license plate covering the open front of both sections and having its data cut out, and bolts passing through the license plate, the first named flanges and the back of the stationary section, and other bolts passing through the license plate, said slots and the back of the slidable section.

In testimony whereof I affix my signature.

RICHARD E. SMITH.